United States Patent Office 3,065,228
Patented Nov. 20, 1962

3,065,228
PROCESS FOR THE PRODUCTION OF Δ5-ANDRO-STENE-19-OL AND Δ5-PREGNENE-19-OL COMPOUNDS
Albert Bowers, Mexico City, Mexico, assignor to Syntex Corporation, Panama, Panama, a corporation of Panama
No Drawing. Filed May 14, 1962, Ser. No. 194,716
Claims priority, application Mexico Nov. 17, 1961
9 Claims. (Cl. 260—239.55)

The present invention relates to a novel process for the production of cyclopentano-phenanthrene derivatives.

More particularly the present invention relates to the process of transforming 5α-bromo-6β,19-oxido androstane and pregnane derivatives into the corresponding Δ5-androstene-19-ol and Δ5-pregnene-19-ol compounds.

In U.S. Patents Nos. 2,001,989 and 3,008,957, in Ringold et al. U.S.P. appl. Serial No. 42,969, filed July 15, 1960, now Patent No. 3,036,068, and in Ringold et al. U.S.P. appl Ser. No. 45,790, , filed July 28, 1960, now Patent No. 3,033,862, there has been disclosed a method for the production of 6β,19-oxido androstane and pregnane derivatives, consisting of treating a 6β-hydroxy androstane or pregnane derivative with lead tetraacetate. When this process is applied to 5α-halo-6β-hydroxy steroids, the expected 5α-halo-6β, 19-oxido compounds are produced.

In accordance with the present invention the surprising discovery has been made, that when 5α-bromo-6β,19-oxido compounds are treated with a reducing agent of the type hereinafter defined in detail, there are produced the corresponding 19-hydroxy-Δ5-derivatives in very high yields. Although other 5α-halo-6β,19-oxido compounds, such as the 5α-chloro-6β,19-oxido derivatives, undergo this reaction, the same high yields cannot be attained.

The process of the present invention is represented by the following scheme:

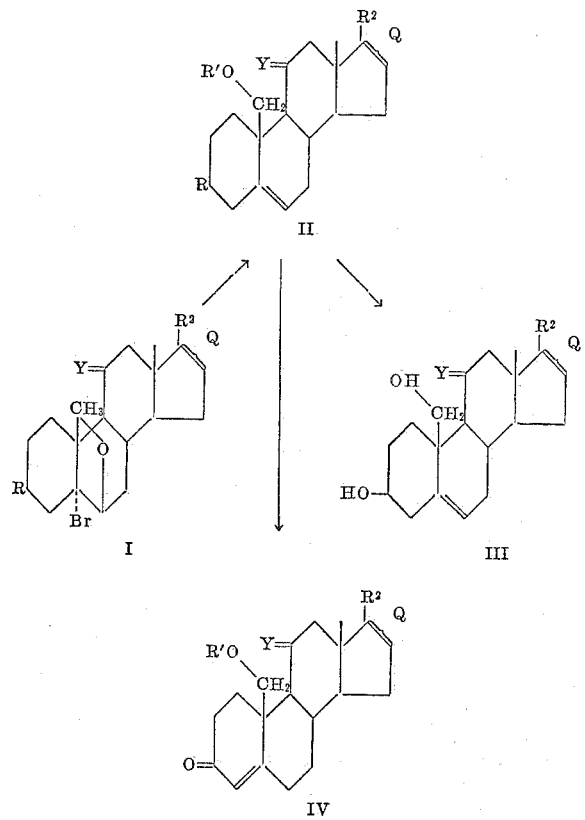

In the above formulas R represents a keto group, a hydroxyl group or a hydrocarbon carboxylic acyloxy group of less than 12 carbon atoms: R' represents hydrogen or a hydrocarbon carboxylic acyl group of less than 12 carbon atoms; R² represents an acyloxy group, a hydroxyl group, a keto group, an acetyl group or the dihydroxyacetone side chain protected by the 17,20;20,21- bismethylenedioxy grouping; Y represents

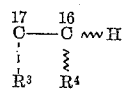

or =O; Q may be a double bond or the group

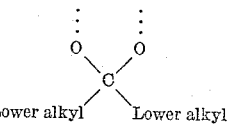

wherein R³ represents hydrogen, hydroxyl or a hydrocarbon carboxylic acyloxy group of less than 12 carbon atoms and R⁴ represents hydrogen, α-methyl, β-methyl or α-hydroxyl; R³ and R⁴ together represent the group $$\underset{\text{Lower alkyl}}{\overset{\vdots}{O}}\underset{\text{Lower alkyl}}{\overset{\vdots}{O}}$$

at the C–16α, C–17α position; when Q is a double bond, R² is the acetyl group.

The acyl and acyloxy groups are derived from hydrocarbon carboxylic acids having less than 12 carbon atoms which may be saturated or unsaturated, of straight, branched, cyclic or mixed aliphatic-cyclic chain, or aromatic, which may be substituted with functional groups such as hydroxyl, alkoxy of up to 5 carbon atoms, acyloxy of up to 12 carbon atoms, nitro, amino or halogen. Typical such ester groups are the acetate, propionate, enanthate, benzoate, trimethylacetate, t-butylacetate, phenoxyacetate, cyclopentylpropionate, aminoacetate and β-chloropropionate.

The starting compound (I) of the process outlined above is obtained in accordance with U.S. Pat. 3,001,989, U.S. Pat. 3,008,957, Ringold et al. U.S.P. appl. Ser. No. 42,969, filed July 15, 1960, and Ringold et al. U.S.P. appl. Ser. No. 45,790, filed July 28, 1960, by condensation of the corresponding 3-acyloxy-5α-bromo-6β-ol derivative with lead tetraacetate to produce the corresponding 3-acyloxy-5α-bromo-6β,19-oxido compound. This derivative may be employed as the starting compound, as well as the corresponding free 3-alcohol resulting from the hydrolysis in slightly basic medium, or the 3-ketone resulting from the oxidation of the latter compound. This starting compound (I) is selected from the group consisting of compounds of the androstane and pregnane series, having a hydroxyl group at C–3, preferably acaylated, or a keto group, having a bromine atoms at C–5α, and an oxygen bridge between C–6β and C–19. At C–17 there may be preferably present a ketone, a 17β-acyloxy group, a 17β-acetyl group with or without a hydroxyl or acyloxy group at C–17α, or the dihydroxyacetone side chain protected as the 17,20;20,21-bismethylenedioxy derivatives. There may further be other groups in the molecule of the starting compound which do not interfere with the reactions, such as for example, when there is a 17β-acetyl substituent, a double bond between C–16 and C–17, or a 16α,17α-diol, preferably protected as the acetonide; an 11-ketone, preferably in the case of compounds having a 17β-dihydroxyacetone side chain; a methyl group at 16α or 16β, etc.

Examples of convenient starting compounds are: the diacetate of 5α-bromo-6β,19-oxido-androstane-3β,17β-diol, the 3-acetate of 5α-bromo-6β,19-oxido-pregnan-3β-ol-20-one, the 3-acetate of 16α-methyl-5α-bromo-6β,19-oxido-pregnan-3β-ol-20-one, the 3-acetate of 16β-methyl- 5α-bromo-6β,19-oxido-pregnan-3β-ol-20-one, the 3-acetate of 16α,17α - isopropylidenedioxy - 5α - bromo - 6β,19-oxido-pregnan-3β-ol-20-one, the 3,17-diacetate of 5α-bromo-6β,19-oxido-pregnane-3β,17α-diol-20-one; the 3-acetate of 17,20;20,21-bismethylene-dioxy-5α-bromo-6β,19-oxido-pregnan-3β-ol-11-one, 5α-bromo-6β,19-oxido-pregnane-3,20-dione, 17,20;20,21-bismethylenedioxy-5α-bromo-6β,19-oxido-pregnane-3,11-dione.

When practicing the process object of the present invention, outlined above, the starting compound (I) is treated with a reagent selected from the group consisting of metals having an oxidation potential between +3.045 and +0.126 volt, inclusive (measured at 25° C.; see C. D. Hodgman, Handbook of Chemistry and Physics, Chemical Rubber Publishing Co., Cleveland, Ohio; 41st edition, year 1959–1960, page 1733), salts which on ionization give cations having an oxidation potential between +0.61 and +0.25 volt, inclusive (loc. cit.), and metal iodides, preferably the iodides of alkali and alkali-earth metals, in an adequate solvent.

When carrying out the reaction with metals of oxidation potential higher than +1.5 volts, such as for example lithium, calcium, sodium, magnesium, etc., there are preferably employed solvents free from active hydrogen atoms, such as the aromatic solvents as benzene, toluene or xylene, ether such as ter-butyl ether or dioxane, halogenated hydrocarbons such as carbon tetrachloride, methylene chloride, etc.

When using metals with an oxidation potential lower than +1.5 volts, such as manganese or zinc for example, there are preferably used lower aliphatic alcohols, such as methanol, ethanol or isopropanol, or liquid hydrocarbon carboxylic acids of less than 12 carbon atoms such as acetic, propionic etc. If the reagent employed is a salt, either of adequate oxidation potential or a metal iodide, the reaction is preferably conducted in a polar organic solvent inert to such salts, such as for example the lower aliphatic ketones, such as acetone, or the lower aliphatic alcohols. Examples of salts with a cation of oxidation potential between +0.61 and +0.25 volt are chromous chloride, vanadium (ous) chloride, etc.

Examples of the metal iodides used in the present reaction are sodium iodide, potassium iodide, calcium iodide, etc.

The reaction is also carried out with mixtures of a metal of oxidation potential between the limits set forth above and of a metal of oxidation potential in the lower limit, such as for example the zinc-copper couple.

When in the reaction there is used as solvent a hydrocarbon carboxylic acid, under the conditions set forth above, there are obtained the corresponding 19-acyloxy derivatives (II; R≠O; R'=acyl) wherein the acyloxy group is derived from the acid used as solvent. With the other solvents there are obtained the corresponding free 19-alcohols (II; R≠O, R'=H).

In the case of the 3-ketones (I; R=O), the substituents at C-19 are determined by the rules mentioned above, but the position of the double-bond in the final products depends upon the solvent. If the reaction is conducted under strictly neutral conditions, the double bond stays in the position between C-5 and C-6 (II; R=O); on the other hand, traces of acids or bases cause the rearrangement of the double bond to the position between C-4 and C-5 (IV). This transformation may be easily effected after the reaction of opening of the oxygen bridge.

The compounds represented by Formula II (R=acyloxy and/or R'=acyl) are conventionally saponified in basic medium to produce the corresponding free Δ5-3β,19-diols (III).

From the above it is evident that the new processes may be especially applied to the pregnane and androstane series.

The reaction conditions are not especially critical, for example, for treating a starting compound of the type set forth above, with zinc dust in ethanol the optimum reaction conditions are at the reflux temperature for an approximate time of 16 hours. However, the reaction may also be carried out at lower temperatures than at reflux, for a period of time which may be shorter or longer, which only causes variations in the yield of the final product.

The intermediates described above may be converted into the corresponding 19-nor derivatives by the methods illustrated by the following equation, wherein only rings A and B are represented:

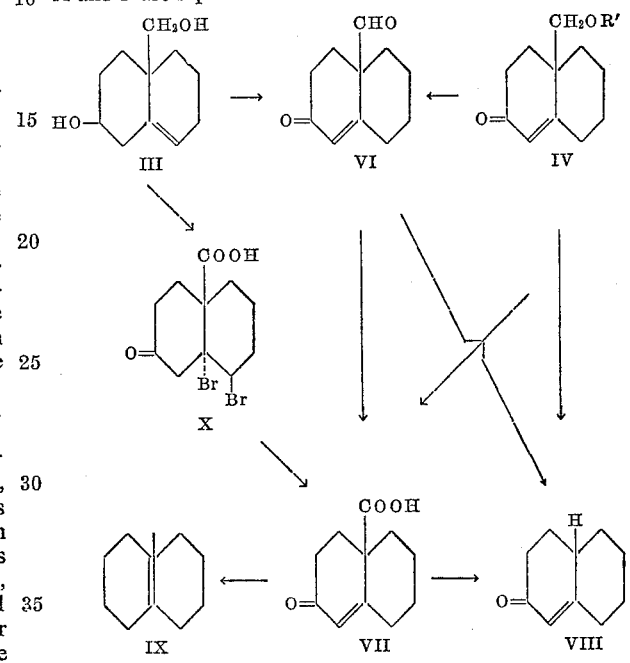

In the above formulas R' has the same meaning set forth previously.

In accordance with the above equation, the Δ5-3,19-diols (III) may be oxidized, for example by the Oppenauer method, to give the corresponding Δ4-19-al-3-ones (VI). The latter compounds may also be obtained by oxidizing the corresponding Δ4-19-ol-3-ones (IV; R'=H), for example by the Oppenauer method or with chromium trioxide in pyridine.

Both the Δ4-19-al-3-ones (VI) as well as the Δ4-19-ol-3-ones (IV; R'=H) may be oxidized in almost quantitative yield to produce the corresponding Δ4-3-one--19-oic acids (VII), for example with Jones reagent (8 N chromic acid in acetone solution).

The latter acids may also be prepared from the corresponding Δ5-3,19-diols by conventional bromination to the 5α,6β-dibromo-3,19-diols, followed by oxidation for example with Jones reagent, to produce the 5α,6β-dibromo-3-one-19-oic acids which on debromination with an appropriate reagent, such as zinc in acetic acid, furnish the desired Δ4-3-one-19-oic acids.

The conversion of the Δ4-3-ketones, with one or more oxygen atoms at C-19 (IV,VI, VII) into the corresponding 19-nor derivatives is carried out by known reactions:

For example, the production of the 19-nor-derivatives starting from 19-hydroxy or acyloxy-Δ4-3-ketones by alkaline treatment of the latter, has been described by G. Winston Barber et al., J. Org. Chem., 20, 1253 (1955), A. S. Meyer, Experientia, 11, 99(1955), and A. Zaffaroni, British Patents Nos. 820,780 and 853,851; the preparation from Δ4-19-al-3-ones by alkali treatment and from Δ4-3-keto-19-oic acids by acid treatment, has been described by H. Hagiwara et al., Chem. Pharm. Bull. Japan, 8, 84 (1960).

In the latter reference there is also described a method for producing Δ5(10)-3-ketones (IX) from Δ4-3-keto-19-oic acids by heating with pyridine.

The application of these processes to the intermediate compounds object of the present invention makes possible the production of important 19-nor derivatives, such as for example 19-nor-$\Delta^4$-androstene-3,17-dione, 19-nor-$\Delta^4$-androsten-17$\beta$-ol-3-one, 19-nor-progesterone, 19-nor-17$\alpha$-hydroxyprogesterone, etc., which in turn may serve as starting compounds for the preparation of other important 19-nor derivatives, known to those skilled in the art.

The following specific examples serve to illustrate our invention, but are not intended to limit its scope.

PREPARATION 1

To a solution of 5 g. of cortisone in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solution was washed with water to neutral, dried over anhydrous sodium sulfate and evaporated ot dryness. The residue was recrystallized from methanol-ether thus affording 17,20, 20,21-bismethylenedioxy-$\Delta^4$-pregnene-3,11-dione.

A solution of 5 g. of the above compound in 50 cc. of acetic anhydride and 5 cc. of acetyl chloride was boiled for 4 hours under an atmosphere of nitrogen. The reaction mixture then was distilled almost to dryness, cooled, diluted with ether and the organic extract washed with water, then wtih 5% sodium bicarbonate solution and finally with water. There was thus obtained 3-acetoxy-17,20;20,21-bismethylenedioxy-$\Delta^{3,5}$-pregnadien-11-one.

A solution of 5 g. of the preceding compound in a mixture of 100 cc. of 95% ethanol and 35 cc. of tetrahydrofuran was cooled to 10° C. and added dropwise, with occasional stirring over a 1 hour period, to a cold solution of 6 g. of sodium borohydride in 50 cc. of 30% ethanol, the reaction temperature not being allowed to exceed 5° C. After completion of addition, the solution was kept at 0–5° C. for 2 hours further; then 200 cc. of 10% sodium hydroxide was added and the solution boiled for 15 minutes. Most of the solvent was removed in vacuo, the residue acidified with 20% hydrochloric acid and the crystalline precipitate collected and washed.

Recrystallization of the crude material from acetone furnished 17,20:20,21-bismethylenedioxy-$\Delta^5$-pregnen-3$\beta$-ol-11-one.

A mixture of 1 g. of the above compound 4 cc. of pyridine and 2 cc. of acetic anhydride was kept at room temperature overnight, poured into ice water, the formed precipitate was filtered, washed with water and dried. Crystallization from acetone-hexane gave the acetate of 17,20; 20,21-bismethylenedioxy-$\Delta^5$-pregnen-3$\beta$-ol-11-one.

PREPARATION 2

Reichstein's compound "S" was treated by the same techniques as described in the preceding preparation, producing consecutively: 17,20;20,21-bismethylenedioxy-$\Delta^4$-pregnen-3-one, 3-acetoxy-17,20;20,21-bismethylenedioxy-$\Delta^{3,5}$-pregnadiene, 17,20;20,21-bismethylenedioxy-$\Delta^5$-pregnen-3$\beta$-ol, the acetate of 17,20;20,21-bismethylenedioxy-$\Delta^5$-pregnen-3$\beta$-ol.

PREPARATION 3

There were suspended 10 g. of diacetate of $\Delta^5$-androsten-3$\beta$,17$\beta$-diol in 100 cc. of dioxane, 12 cc. of 0.46 N perchloric acid were added and then 4 g. of N-bromoacetamide; the N-bromoacetamide was added little by little, stirring over the period of 1 hour, in the absence of light and at a temperature of about 15° C. stirring was continued for 1 hour in darkness and at room temperature; the mixture was then decolorated by addition of a 10% aqueous sodium bisulfite solution there was added 1 liter of water and the mixture was extracted with methylene chloride; the extract was washed with water, dried over anhydrous sodium sulfate and the solvent was evaporated, under reduced pressure and at room temperature, thus giving 5$\alpha$-bromo-androstane-3$\beta$,6$\beta$,17$\beta$-triol 3,17-diacetate.

Following the same technique, there were treated the compounds under I, thus affording the products under II.

| I | II |
|---|---|
| Acetate of pregnenolone. | 3-acetate of 5$\alpha$-bromo-pregnane-3$\beta$,6$\beta$-diol-20-one. |
| Acetate of $\Delta^{5,16}$-pregnadien-3$\beta$-ol-20-one. | 3-acetate of 5$\alpha$-bromo-$\Delta^{16}$-pregnene-3$\beta$,6$\beta$-diol-20-one. |
| Acetate of 17,20; 20,21-bismethylenedioxy-$\Delta^5$-pregnen-3$\beta$-ol-11-one. | 3-acetate of 17,20; 20,21-bismethylenedioxy - 5$\alpha$-bromo-pregnane-3$\beta$,6$\beta$-diol-11-one. |
| Acetate of 17,20; 20,21-bismethylenedioxy - $\Delta^5$ - pregnen-3$\beta$-ol. | 3-acetate of 17,20; 20,21-bismethylenedioxy - 5$\alpha$-bromo-pregnane-3$\beta$,6$\beta$-diol. |

PREPARATION 4

To a solution of 4 g. of the 3,17-diacetate of 5$\alpha$-bromo-androstane-3$\beta$,6$\beta$,17$\beta$-triol in 150 cc. of dry benzene, were added 6 g. of lead tetraacetate and the mixture was refluxed for 18 hours. It was cooled, filtered, water was added to the filtrate, the benzene layer was separated, washed with water and the benzene was evaporated under reduced pressure; upon chromatography of the residue on neutral alumina, there was obtained the diacetate of 5$\alpha$-bromo-6$\beta$,19-oxido androstane-3$\beta$,17$\beta$-diol.

The compounds under I were treated in the same manner, thus giving the products under II.

| I | II |
|---|---|
| 3-acetate of 5$\alpha$-bromo-pregnane-3$\beta$,6$\beta$-diol-20-one. | 3-acetate of 5$\alpha$-bromo-6$\beta$,19-oxido-pregnan-3$\beta$-ol-20-one. |
| 3-acetate of 5$\alpha$-bromo-$\Delta^{16}$-pregnene-3$\beta$,6$\beta$-diol-20-one. | 3-acetate of 5$\alpha$-bromo-6$\beta$,19-oxido-$\Delta^{16}$-pregnen - 3$\beta$-ol-20-one. |
| 3-acetate of 17,20; 20,21-bismethylenedioxy - 5$\alpha$-bromo-pregnane-3$\beta$,6$\beta$-diol-11-one. | 3-acetate of 17,20; 20,21-bismethylenedioxy - 5$\alpha$-bromo-6$\beta$,19 - oxido-pregnan-3$\beta$-ol-11-one. |
| 3-acetate of 17,20; 20,21-bismethylenedioxy - 5$\alpha$-bromo-pregnane-3$\beta$,6$\beta$-diol. | 3-acetate of 17,20; 20,21-bismethylenedioxy - 5$\alpha$-bromo-6$\beta$,19-oxido-pregnan-3$\beta$-ol. |

PREPARATION 5

A suspension of 3 g. of the diacetate of 5$\alpha$-bromo-6$\beta$,19-oxido-androstane-3$\beta$,17$\beta$-diol in 180 cc. of methanol was treated with a solution of 3 g. of potassium carbonate in 18 cc. of water; the mixture was boiled under reflux for 1 hour and then cooled in ice and diluted with water. The formed precipitate was collected and by recrystallization from acetone-hexane yielded 5$\alpha$-bromo-6$\beta$,19-oxido-androstane-3$\beta$,17$\beta$-diol. In the same manner, the rest of the compounds obtained in the foregoing preparation were transformed respectively into the following products: 5$\alpha$-bromo-6$\beta$,19-oxido-pregnan-3$\beta$-ol-20-one, 5$\alpha$-bromo-6$\beta$,19-oxido-$\Delta^{16}$-pregnen-3$\beta$-ol-20-one, 17,20;20,21-bismethylenedioxy - 5$\alpha$ - bromo-6$\beta$,19-oxido-pregnan-3$\beta$-ol-11-one, and 17,20;20,21-bismethylenedioxy-5$\alpha$-bromo-6$\beta$,19-oxido-pregnan-3$\beta$-ol.

PREPARATION 6

A solution of 2 g. of 5$\alpha$-bromo-6$\beta$,19-oxido-androstane-3$\beta$,17$\beta$-diol in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 5$\alpha$-bromo-6$\beta$,19-oxido-androstane-3,17-dione.

The rest of the compounds obtained in the foregoing preparation were treated by the same method, giving respectively: 5$\alpha$ - bromo-6$\beta$,19-oxido-pregnane-3,20-dione, 5$\alpha$-bromo-6$\beta$,19-oxido-$\Delta^{16}$-pregnene-3,20-dione, 17,20;20,21 - bismethylenedioxy-5$\alpha$-bromo-6$\beta$,19-oxido-pregnane-3,11-dione and 17,20;20,21-bismethylenedioxy-5$\alpha$-bromo-6$\beta$,19-oxido-pregnane-3-one.

PREPARATION 7

The known compound, 3$\beta$,17$\alpha$-diacetoxy-$\Delta^5$-pregnen-20- one, was successively treated according to Preparations 3 and 4 giving respectively: the 3,17-diacetate of 5α-bromo-pregnane-3β,6β,17α-triol-20-one and the 3,17-diacetate of 5α-bromo-6β,19-oxido-pregnane-3β,17α-diol-20-one.

PREPARATION 8

The known compound, the acetate of 16α-methyl-Δ⁵-pregnen-3β-ol-20-one, was treated according to Preparations 3 and 4, giving consecutively: the 3-acetate of 16α-methyl-5α-bromo-pregnane-3β,6β-diol-20-one and the 3-acetate of 16α-methyl-5α-bromo-6β,19-oxido-pregnan-3β-ol-20-one.

PREPARATION 9

The acetate of 16β-methyl-Δ⁵-pregnen-3β-ol-20-one, obtained by conventional acetylation of the known compound, 16β-methyl-Δ⁵-pregnen-3β-ol-20-one, in pyridine with acetic anhydride, was treated according to Preparations 3 and 4 giving successively: the 3-acetate of 16β-methyl-5α-bromo-pregnane-3β,6β-diol-20-one and the 3-acetate of 16β-methyl-5α-bromo-6β,19-oxido-pregnan-3β-ol-20-one.

PREPARATION 10

The diacetate of 16α-methyl-Δ⁵-pregnene-3β,17α-diol-20-one, which is a known compound, was treated according to Preparations 3 and 4, giving successively: 3,17-diacetate of 16α-methyl-5α-bromo-pregnane-3β,6β,17α-triol-20-one and the 3,17-diacetate of 16α-methyl-5α-bromo-6β,19-oxido-pregnane-3β,17α-diol-20-one.

PREPARATION 11

16α,17α-isopropylidenedioxy - Δ⁵ - pregnen-3β-ol-20-one (G. Cooley et al., J. Chem. Soc., 4377 (1955)) was conventionally acetylated in pyridine with acetic anhydride, thus giving the corresponding 3-acetate, which was treated according to Preparations 3 and 4, giving successively: the 3-acetate of 16α,17α-isopropylidenedioxy-5α-bromo-pregnane-3β,6β-diol-20-one and the 3-acetate of 16α,17α-isopropylidenedioxy - 5α - bromo - 6β,19 - oxido-pregnan-3β-ol-20-one.

PREPARATION 12

The acetate of Δ⁵-androsten-3β-ol-17-one was treated according to Preparations 3 and 4, giving successively: the acetate of 5α-bromo-androstane-3β,6β-diol-17-one and the acetate of 5α-bromo-6β,19-oxido-androstan-3β-ol-17-one.

Example 1

A mixture of 5 g. of the diacetate of 5α-bromo-6β,19-oxido-androstane-3β,17β-diol, 25 g. of zinc dust and 400 cc. of glacial acetic acid was refluxed under stirring for 16 hours, at the ends of which the mixture was filtered through celite. The filtrate was concentrated to a small volume under reduced pressure, cooled and diluted with ice water to precipitate the crude product. Recrystallization from acetone-hexane furnished the triacetate of Δ⁵-androsten-3β,17β,19-triol.

Example 2

A mixture of 1 g. of the diacetate of 5α-bromo-6β,19-oxido-androstane-3β,17β-diol, 5 g. of zinc dust and 50 cc. of ethanol was refluxed for 16 hours and then filtered throught celite. The filtrate was evaporated to dryness and the residue crystallized from acetone-hexane, thus yielding the 3,17-diacetate of Δ⁵-androstene-3β,17β,19-triol.

Example 3

A mixture of 5 g. of the diacetate of 5α-bromo-6β,19-oxido-androstane-3β,17β-diol, 10 g. of zinc dust and 350 cc. of glacial acetic acid was refluxed for 20 hours under vigorous stirring. The mixture was then worked up by the process described in Example 1, thus affording the triacetate of Δ⁵-androstene-3β,17β,19-triol.

Example 4

A mixture of 1 g. of the diacetate of 5α-bromo-6β,19-oxido-androstane-3β,17β-diol, 6 g. of zinc and 50 cc. of ethanol was refluxed for 12 hours, then filtered through celite and the filtrate was poured into water. The precipitate formed was collected by filtration, washed with water and dried. Recrystallization from acetone-hexane afforded the 3,17-diacetate of Δ⁵-androstene-3β,17β,19-triol.

Example 5

To 2 g. of the diacetate of 5α-bromo-6β,19-oxido-androstane-3β,17β-diol in 100 cc. of benzene was added a mixture of 5 g. of finely divided sodium metal and 200 cc. of benzene and the resulting mixture was refluxed under an atmosphere of nitrogen for 24 hours. The excess of sodium was cautiously removed by filtration and the solution was treated with 5 cc. of methanol and then with water.

The organic layer was separated, dried and evaporated to dryness under reduced pressure. The residue was crystallized from methanol-benzene, thus giving the 3,17-diacetate of Δ⁵-androstene-3β,17β,19-triol.

Example 6

The diacetate of 5α-bromo-6β,19-oxido-androstane-3β,17β-diol was treated by the method described in the preceding example, except that the sodium metal was substituted by lithium metal, thus affording a product identical with the one obtained in such example.

Example 7

The diacetate of 5α-bromo-6β,19-oxido-androstane-3β,17β-diol was treated in the same manner as in Example 5, except that calcium metal was used instead of sodium metal, thus affording a product identical with the one obtained in such example.

Example 8

The diacetate of 5α-bromo-6β,19-oxido-androstane-3β,17β-diol was treated by the method described in Example 5, except that the sodium metal was substituted by magnesium metal, thus giving a product identical with the one obtained in such example.

Example 9

The diacetate of 5α-bromo-6β,19-oxido-androstane-3β,17β-diol was treated in accordance with the method of Example 2, except that the zinc was substituted by manganese, thus obtaining a product identical with the one obtained in such example.

Example 10

The diacetate of 5α-bromo-6β,19-oxido-androstane-3β,17β-diol was treated in accordance with the method of Example 5, except that the benzene was substituted by xylene, thus giving the same product.

Example 11

The diacetate of 5α-bromo-6β,19-oxido-androstane-3β,17β-diol was treated in accordance with the method of Example 5, except that the benzene was substituted by terbutyl ether, thus giving the same product as in such example.

Example 12

The diacetate of 5α-bromo-6β,19-oxido-androstane-3β,17β-diol was treated in accordance with the method of Example 5, except that the benzene was substituted by carbon tetrachloride, thus affording the same product.

Example 13

The starting compound of Example 1 was treated in accordance with the method described in that example, except that the acetic acid was substituted by propionic acid, thus giving the 3,17-diacetate-19-propionate of Δ⁵-androstane-3β,17β,19-triol.

*Example 14*

The starting compound of Example 2 was treated by the process described in that example, except that the ethanol was substituted by methanol, thus giving the same product.

*Example 15*

The starting compound of Example 2 was treated in accordance with the method of that example, except that instead of zinc dust there was employed zinc-copper dust. This reagent was prepared by suspending 5 g. of zinc dust in a solution of 3 g. of copper sulfate in 200 cc. of water. The powder formed was used for the reaction, which yielded a product identical with the one obtained in the aforementioned example.

*Example 16*

To a solution of 1 g. of the diacetate of 5α-bromo-6β,19-oxido-androstane-3β,17β-diol in 200 cc. of acetone was added at room temperature, under an atmosphere of nitrogen, 60 cc. of a recently prepared solution of chromous chloride (Rosenkranz et al., J. Am. Chem. Soc., 72, 4077 (1950)). After 5 minutes the acetone was removed under reduced pressure, water was added and the precipitate was collected and dried. Recrystallization from acetone-hexane afforded the 3,17-diacetate of Δ⁵-androstene-3β,17β,19-triol.

*Example 17*

To a solution of 3 g. of the diacetate of 5α-bromo-6β,19-oxido-androstane-3β,17β-diol in 100 cc. of acetone was added at room temperature and under an atmosphere of nitrogen 5 g. of vanadium (ous) chloride in 200 cc. of acetone. The mixture was kept under the same conditions for 2 hours, then diluted with water and the acetone was evaporated under reduced pressure; the resulting solid was collected, washed with water and dried. By recrystallization from acetone-hexane there was obtained the 3,17-diacetate of Δ⁵-androstene-3β,17β,19-triol,

*Example 18*

A mixture of 2 g. of the diacetate of 5α-bromo-6β,19-oxido-androstane-3β,17β-diol, 2 g. of sodium iodide and 50 cc. of methylethyl ketone was refluxed for 8 hours, then cooled, poured into water and extracted with ethyl acetate. The organic extract was dried over anhydrous sodium sulfate and evaporated to dryness. By crystallization of the residue from acetone-hexane there was obtained the 3,17-diacetate of Δ⁵-androstene-3β,17β,19-triol.

*Example 19*

The starting compound of the preceding example was treated by the method described in such example, except that the sodium iodide was substituted by potassium iodide, thus giving the same product.

*Example 20*

The starting compound of Example 18, was treated by the method described in that example, but calcium iodide was used instead of sodium iodide, thus giving the same product.

*Example 21*

The compounds under I were treated by the method described in Example 1, thus yielding the products under II.

| I | II |
|---|---|
| 3-acetate of 5α-bromo-6β,19-oxido-pregnan-3β-ol-20-one. | 3,19-diacetate of Δ⁵-pregnene-3β,19-diol-20-one. |
| 3-acetate of 16α-methyl-5α-bromo-6β,19-oxido-pregnan-3β-ol-20-one. | 3,19-diacetate of 16α-methyl-Δ⁵-pregnene-3β,19-diol-20-one. |
| 3-acetate of 16β-methyl-5α-bromo-6β,19-oxido-pregnan-3β-ol-20-one. | 3,19-diacetate of 16β-methyl-Δ⁵-pregnene-3β,19-diol-20-one. |
| 3-acetate of 16α,17α-isopropylidenedioxy-5α-bromo-6β,19-oxido-pregnan-3β-ol-20-one. | 3,19-diacetate of 16α,17α-isopropylidenedioxy-Δ⁵-pregnene-3β,19-diol-20-one. |
| 3,17-diacetate of 5α-bromo-6β,19-oxido-pregnane-3β,17α-diol-20-one. | Triacetate of Δ⁵-pregnene-3β,17α,19-triol-20-one. |
| 3,17-diacetate of 16α-methyl-5α-bromo-6β,19-oxido-pregnane-3β,17α-diol-20-one. | Triacetate of 16α-methyl-Δ⁵-pregnene-3β,17α,19-triol-20-one. |
| 3-acetate of 5α-bromo-6β,19-oxido-Δ¹⁶-pregnen-3β-ol-20-one. | 3,19-diacetate of Δ⁵,¹⁶-pregnadiene-3β,19-diol-20-one. |
| 3-acetate of 17,20;20,21-bismethylenedioxy-5α-bromo-6β,19-oxido-pregnan-3β-ol-11-one. | 3,19-diacetate of 17,20;20,21-bismethylenedioxy-Δ⁵-pregnene-3β,19-diol-11-one. |
| 3-acetate of 17,20;20,21-bismethylenedioxy-5α-bromo-6β,19-oxido-pregnan-3β-ol. | 3,19-diacetate of 17,20;20,21-bismethylenedioxy-Δ⁵-pregnene-3β,19-diol. |
| 3-acetate of 5α-bromo-6β,19-oxido-androstan-3β-ol-17-one. | 3,19-diacetate of Δ⁵-androstene-3β,19-diol-17-one. |

*Example 22*

The compounds under I, were treated by the process described in Example 2, thus affording the compounds under II.

| I | II |
|---|---|
| 3-acetate of 5α-bromo-6β,19-oxido-pregnan-3β-ol-20-one. | 3-acetate of Δ⁵-pregnene-3β,19-diol-20-one. |
| 3-acetate of 16α-methyl-5α-bromo-6β,19-oxido-pregnan-3β-ol-20-one. | 3-acetate of 16α-methyl-Δ⁵-pregnene-3β,19-diol-20-one. |
| 3-acetate of 16β-methyl-5α-bromo-6β,19-oxido-pregnan-3β-ol-20-one. | 3-acetate of 16β-methyl-Δ⁵-pregnene-3β,19-diol-20-one. |
| 3-acetate of 16α,17α-isopropylidenedioxy-5α-bromo-6β,19-oxido-pregnan-3β-ol-20-one. | 3-acetate of 16α,17α-isopropylidenedioxy-Δ⁵-pregnene-3β,19-diol-20-one. |
| 3,17-diacetate of 5α-bromo-6β,19-oxido-pregnane-3β,17α-diol-20-one. | 3,17-diacetate of Δ⁵-pregnene-3β,17α,19-triol-20-one. |
| 3,17-diacetate of 16α-methyl-5α-bromo-6β,19-oxido-pregnane-3β,17α-diol-20-one. | 3,17-diacetate of 16α-methyl-Δ⁵-pregnene-3β,17α,19-triol-20-one. |
| 3-acetate of 5α-bromo-6β,19-oxido-Δ¹⁶-pregnene-3β-ol-20-one. | 3-acetate of Δ⁵,¹⁶-pregnadiene-3β,19-diol-20-one. |
| 3-acetate of 17,20;20,21-bismethylenedioxy-5α-bromo-6β,19-oxido-pregnan-3β-ol-11-one. | 3-acetate of 17,20;20,21-methylenedioxy-Δ⁵-pregnene-3β,19-diol-11-one. |
| 3-acetate of 17,20;20,21-bismethylenedioxy-5α-bromo-6β,19-oxido-pregnan-3β-ol. | 3-acetate of 17,20;20,21-bismethylenedioxy-Δ⁵-pregnene-3β,19-diol. |
| 3-acetate of 5α-bromo-6β,19-oxido-androstan-3β-ol-17-one. | 3-acetate of Δ⁵-androstene-3β,19-diol-17-one. |

*Example 23*

A solution of 2 g. of the 3,17-diacetate of Δ⁵-androstene-3β,17β,19-triol in 50 cc. of methanol was treated with 5 cc. of a 4% aqueous potassium hydroxide solution and the reaction mixture was stirred at 0° C. for 1 hour under atmosphere nitrogen; the mixture was then neutralized with acetic acid and the methanol was distilled under reduced pressure.

The residue was triturated with water and the solid was collected, washed with water, dried and crystallized from ethyl acetate-methanol, thus yielding Δ⁵-androstene-3β,17β,19-triol.

By the same process there were treated the compounds under I to produce the corresponding compounds under II.

| I | II |
|---|---|
| 3-acetate of Δ⁵-pregnene-3β,19-diol-20-one. | Δ⁵-pregnene-3β,19-diol-20-one. |
| 3-acetate of 16α-methyl-Δ⁵-pregnene-3β,19-diol-20-one. | 16α-methyl-Δ⁵-pregnene-3β,19-diol-20-one. |
| 3-acetate of 16β-methyl-Δ⁵-pregnene-3β,19-diol-20-one. | 16β-methyl-Δ⁵-pregnene-3β,19-diol-20-one. |
| 3-acetate of 16α,17α-isopropylidenedioxy-Δ⁵-pregnene-3β,19-diol-20-one. | 16α,17α-isopropylidenedioxy-Δ⁵-pregnene-3β,19-diol-20-one. |
| 3,17-diacetate of Δ⁵-pregnene-3β,17α,19-triol-20-one. | 17-acetate of Δ⁵-pregnene-3β,17α,19-triol-20-one. |
| 3,17-diacetate of 16α-methyl-Δ⁵-pregnene-3β,17α,19-triol-20-one. | 17-acetate of 16α-methyl-Δ⁵-pregnene-3β,17α,19-triol-20-one. |
| 3-acetate of Δ⁵,¹⁶-pregnadiene-3β,19-diol-20-one. | Δ⁵,¹⁶-pregnadiene-3β,19-diol-20-one. |
| 3-acetate of 17,20;20,21-bismethylenedioxy-Δ⁵-pregnene-3β,19-diol-11-one. | 17,20;20,21-bismethylenedioxy-Δ⁵-pregnene-3β,19-diol-11-one. |
| 3-acetate of 17,20;20,21-bismethylenedioxy-Δ⁵-pregnene-3β,19-diol. | 17,20;20,21-bismethylenedioxy-Δ⁵-pregnene-3β,19-diol. |
| 3-acetate of Δ⁵-androstene-3β,19-diol-17-one. | Δ⁵-androstene-3β,19-diol-17-one. |

*Example 24*

A mixture of 1 g. of the 3,19-diacetate of 17,20;20,21-bismethylenedioxy-Δ⁵-pregnene-3β,19-diol-11-one and 20 cc. of 60% formic acid was heated for 1 hour on the steam bath, cooled, diluted with water and the precipitate formed was collected washed with water, dried and recrystallized from acetone-hexane, thus affording the 3,19-diacetate of Δ⁵-pregnene-3β,17α,19,21-tetrol-11,20-dione.

There were treated in the same manner the 3-acetate of 17,20;20,21-bismethylenedioxy-Δ⁵-pregnene-3β,19-diol-11-one and 17,20;20,21-bismethylenedioxy-Δ⁵-pregnene-3β,19-diol-11-one, thus giving respectively the 3-acetate of Δ⁵-pregnene-3β,17α,19,21-tetrol-11,20-dione and Δ⁵-pregnene-3β,17α,19,21-tetrol-11,20-dione.

*Example 25*

The compounds under I, were treated by following the process described in Example 1, except that the reflux time was of 3 hours, thus affording the corresponding products under II.

| I | II |
|---|---|
| 5α-bromo-6β,19-oxido-androstan-3β,17β-diol. | 19-acetate of Δ⁵-androstene-3β,17β,19-triol. |
| 5α-bromo-6β,19-oxido-pregnan-3β-ol-20-one. | 19-acetate of Δ⁵-pregnene-3β,19-diol-20-one. |
| 5α-bromo-6β,19-oxido-Δ¹⁶-pregnene-3β-ol-20-one. | 19-acetate of Δ⁵,¹⁶-pregnadiene-3β,19-diol-20-one. |
| 17,20;20,21-bismethylenedioxy-5α-bromo-6β,19-oxido-pregnan-3β-ol-11-one. | 19-acetate of 17,20;20,21-bismethylenedioxy-Δ⁵-pregnene-3β,19-diol-11-one. |
| 17,20;20,21-bismethylenedioxy-5α-bromo-6β,19-oxido-pregnan-3β-ol. | 19-acetate of 17,20;20,21-bismethylenedioxy-Δ⁵-pregnene-3β,19-diol-11-one. |

*Example 26*

The starting compounds of the preceding example were treated in accordance with Example 2, thus giving respectively the following compounds: Δ⁵-androstene-3β, 17β, 19-triol, Δ⁵-pregnene-3β,19-diol-20-one, Δ⁵,¹⁶-pregnadiene-3β,19-diol-20-one, 17,20;20,21-bismethylenedioxy-Δ⁵-pregnene-3β,19-diol-11-one, and 17,20;20,21-bismethylenedioxy-Δ⁵-pregnene-3β,19-diol.

*Example 27*

The starting compounds under I, were treated by the method of Example 1, thus furnishing the corresponding products under II.

| I | II |
|---|---|
| 5α-bromo-6β,19-oxido-androstane-3,17-dione. | 19-acetate of Δ⁴-androsten-19-ol-3,17-dione. |
| 5α-bromo-6β,19-oxido-pregnane-3,20-dione. | 19-acetate of Δ⁴-pregnene-19-ol-3-20-dione. |
| 5α-bromo-6β,19-oxido-Δ¹⁶-pregnene-3,20-dione. | 19-acetate of Δ⁴,¹⁶-pregnadien-19-ol-3,20-dione. |
| 17,20;20,21-bismethylenedioxy-5α-bromo-6β,19-oxido-pregnane-3,11-dione. | 19-acetate of 17,20;20,21-bismethylenedioxy-Δ⁴-pregnene-19-ol-3,11-dione. |
| 17,20;20,21-bismethylenedioxy-5α-bromo-6β,19-oxido-pregnan-3-one. | 19-acetate of 17,20;20,21-bismethylenedioxy-Δ⁴-pregnen-19-ol-3-one. |

*Example 28*

The starting compounds of the preceding example were treated in accordance with the method of Example 2, thus giving respectively: Δ⁵-androsten-19-ol-3,20-dione, Δ⁵,¹⁶-pregnadiene,19-ol-3,20-dione, 17,20;20,21-bismethylenedioxy-Δ⁵-pregnen-19-ol-3,11-dione, and 17,20;20,21-bismethylenedioxy-Δ⁵-pregnen-19-ol-3-one.

I claim:

1. A process for the production of a compound selected from the group consisting of 19-hydroxy-Δ⁵-androstene and 19-hydroxy-Δ⁵-pregnene derivatives, which comprises treating the corresponding compound selected from the group consisting of 5α-bromo-6β,19-oxido androstene and 5α-bromo-6β,19-oxido pregnane derivatives with a reagent selected from the group consisting of metals with an oxidation potential between +3.045 and +1.51 volts inclusive, in solvents free from active hydrogen atoms, metals with an oxidation potential between +1.5 and +0.126 volts inclusive, in lower aliphatic alcohols, metals with an oxidation potential between +1.5 and +0.126 volts inclusive, in liquid hydrocarbon carboxylic acids of less than 12 carbon atoms, salts which on ionization give cations with an oxidation potential between +0.61 and +0.25 volt inclusive, in lower aliphatic ketones, salts which on ionization give cations with an oxidation potential between +0.61 and +0.25 volt inclusive in lower aliphatic alcohols, metal iodides in lower aliphatic ketones, and metal iodides in lower aliphatic alcohols.

2. The process of claim 1, wherein the reagent is zinc in a lower aliphatic alcohol.

3. The process of claim 1, wherein the reagent is zinc in a liquid hydrocarbon carboxylic acid of less than 12 carbon atoms.

4. The process of claim 2, wherein the alcohol is ethanol.

5. The process of claim 3, wherein the acid is acetic acid.

6. The process of claim 1, wherein the reagent is zinc-copper couple in a lower aliphatic alcohol.

7. The process of claim 1, where the reagent is sodium metal in a solvent free from active hydrogen atoms.

8. The process of claim 1, wherein the reagent is chromous chloride in a lower aliphatic ketone.

9. The process of claim 1, wherein the reagent is sodium iodide in a lower aliphatic ketone.

No references cited.

UNITED STATES PATENT OFFICE
CERTIFICATE OF CORRECTION

Patent No. 3,065,228                             November 20, 1962

Albert Bowers

It is hereby certified that error appears in the above numbered patent requiring correction and that the said Letters Patent should read as corrected below.

Column 12, line 30, for "androstene" read -- androstane --.

Signed and sealed this 26th day of May 1964.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,065,228

November 20, 1962

Albert Bowers

It is hereby certified that error appears in the above numbered patent requiring correction and that the said Letters Patent should read as corrected below.

Column 12, line 30, for "androstene" read -- androstane --.

Signed and sealed this 26th day of May 1964.

(SEAL)
Attest:

ERNEST W. SWIDER
Attesting Officer

EDWARD J. BRENNER
Commissioner of Patents

Notice of Adverse Decision in Interference

In Interference No. 93,402 involving Patent No. 3,065,228, A. Bowers, PROCESS FOR THE PRODUCTION OF $\Delta^5$-ANDROSTENE-19-OL AND $\Delta^5$-PREGNENE-19-OL COMPOUNDS, final judgment adverse to the patentee was rendered Aug. 30, 1965, as to claims 1, 3 and 5.
[*Official Gazette December 14, 1965.*]